(12) United States Patent
Wade (10) Patent No.: US 12,536,604 B2
(45) Date of Patent: *Jan. 27, 2026

(54) SYSTEM AND METHOD FOR CONTINUOUS BIOMETRIC MONITORING

(71) Applicant: Biometrica Systems, Inc., Las Vegas, NV (US)

(72) Inventor: Wyly Wade, Chandler, AZ (US)

(73) Assignee: Biometrica Systems, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,919

(22) Filed: Feb. 26, 2024

(65) Prior Publication Data

US 2024/0193715 A1 Jun. 13, 2024

Related U.S. Application Data

(63) Continuation of application No. 16/023,452, filed on Jun. 29, 2018, now Pat. No. 11,928,749.

(51) Int. Cl.
*G06Q 50/26* (2024.01)
*G06Q 10/105* (2023.01)
*G06V 40/12* (2022.01)
*G06V 40/16* (2022.01)

(52) U.S. Cl.
CPC ......... *G06Q 50/265* (2013.01); *G06Q 10/105* (2013.01); *G06V 40/1365* (2022.01); *G06V 40/172* (2022.01)

(58) Field of Classification Search
CPC ............... G06Q 50/265; G06Q 10/105; G06K 9/00087; G06K 9/00288
See application file for complete search history.

(56) References Cited

U.S. PATENT DOCUMENTS

| | | | | |
|---|---|---|---|---|
| 9,374,374 B2 * | 6/2016 | Steinberg | ............ | H04L 63/0245 |
| 10,223,760 B2 * | 3/2019 | Ananthanpillai | ..... | G06F 21/552 |
| 10,255,419 B1 * | 4/2019 | Kragh | ..................... | H04L 9/321 |
| 10,339,733 B2 * | 7/2019 | Al-Shaikh | ............. | H04W 4/029 |
| 10,360,744 B1 * | 7/2019 | Kerzner | ................. | H04N 7/185 |
| 10,490,305 B1 * | 11/2019 | Kocher | .................. | G16H 40/67 |

(Continued)

*Primary Examiner* — Jessica Lemieux
*Assistant Examiner* — Joshua D Schneider
(74) *Attorney, Agent, or Firm* — Carlos R. Villamar; The Villamar Firm PLLC (57) ABSTRACT

A system, method and computer program product for continuous monitoring based on biometric information, includes an employee database storing employee information, including an employee name photograph; a notification server transmitting an incoming event, including an employee verification request, including a name of an employee name and a photograph of the employee to be verified; and a verification server couple to the notification server and accessing the employee database, based on the incoming event received from the notification server. The verification server determining if the name of the employee to be verified matches a name in the employee database, and if so, determining if the photograph of the employee to be verified biometrically matches a photograph corresponding to the matching name in the employee database, and if so, transmitting a positive verification result notification including multijurisdictional arrest and conviction data to a customer device via the notification server.

15 Claims, 3 Drawing Sheets

(56) References Cited

U.S. PATENT DOCUMENTS

| | | | | |
|---|---|---|---|---|
| 2003/0044050 | A1* | 3/2003 | Clark | H04L 63/0861 |
| | | | | 340/5.82 |
| 2004/0213437 | A1* | 10/2004 | Howard | G06F 16/93 |
| | | | | 707/999.009 |
| 2005/0055231 | A1* | 3/2005 | Lee | G06Q 10/1053 |
| | | | | 705/321 |
| 2005/0273453 | A1* | 12/2005 | Holloran | G06Q 10/10 |
| 2006/0018520 | A1* | 1/2006 | Holloran | G06Q 10/10 |
| | | | | 382/116 |
| 2011/0046920 | A1* | 2/2011 | Amis | G08B 27/00 |
| | | | | 709/217 |
| 2012/0317174 | A1* | 12/2012 | Miller | G06Q 10/10 |
| | | | | 709/203 |
| 2014/0040309 | A1* | 2/2014 | Meaney | G06Q 50/265 |
| | | | | 707/769 |
| 2015/0363586 | A1* | 12/2015 | Klevan | G06F 21/6245 |
| | | | | 726/19 |
| 2017/0236230 | A1* | 8/2017 | Thomas | H04L 67/535 |
| | | | | 705/325 |
| 2019/0325397 | A1* | 10/2019 | Coats | G06Q 50/26 |

* cited by examiner

SYSTEM AND METHOD FOR CONTINUOUS BIOMETRIC MONITORING

CROSS REFERENCE TO RELATED DOCUMENTS

The present disclosure is a continuation of U.S. patent application Ser. No. 16/023,452 of Wyly WADE, entitled "SYSTEM AND METHOD FOR CONTINUOUS BIOMETRIC MONITORING," filed on 29 Jun. 2018, now allowed, the entire disclosure of which is hereby incorporated by reference herein.

BACKGROUND OF THE INVENTION

Field of the Invention

The present invention generally relates to systems and methods for monitoring, and more particularly to systems and methods for continuous monitoring based on biometric information, and the like.

Discussion of the Background

In recent years, systems and methods for monitoring have been developed. However, such systems typically are lacking in effective monitoring, for example, of existing and potential employees, and the like, based on biometric information, and the like, in an efficient and cost-effective manner.

SUMMARY OF THE INVENTION

Therefore, there is a need for a method and system that addresses the above and other problems. The above and other problems are addressed by the illustrative embodiments of the present invention, which provide systems and methods for effective monitoring, for example, of existing and potential employees, and the like, based on biometric information, and the like, in an efficient and cost-effective manner.

Accordingly, in illustrative aspects of the present invention there is provided a system, method and computer program product continuous monitoring based on biometric information, includes an employee database storing employee information, including an employee name photograph; a notification server transmitting an incoming event, including an employee verification request, including a name of an employee name and a photograph of the employee to be verified; and a verification server couple to the notification server and accessing the employee database, based on the incoming event received from the notification server. The verification server determining if the name of the employee to be verified matches a name in the employee database, and if so, determining if the photograph of the employee to be verified biometrically matches a photograph corresponding to the matching name in the employee database, and if so, transmitting a positive verification result notification including multijurisdictional arrest and conviction data to a customer device via the notification server.

The incoming event is received from and the positive verification result notification is transmitted to the customer device via a third party server coupled to the notification server over a communications network.

The third party server includes one of an email server, a short message service (SMS) server, a multimedia messaging service (MMS) server, a WhatsApp Messenger server, and a third party messaging platform.

The biometric verification is based on software and/or hardware running on the verification server, including one of automated fingerprint identification system (AFIS) software and/or hardware, automated biometrics identification system (ABIS) software and/or hardware, Cognitec facial recognition software and/or hardware, FaceVACS facial recognition software and/or hardware, IRIS ID identity authentication software and/or hardware, UIDAI face authentication application programming interface (API) software and/or hardware, and PalmSecure biometric authentication software and/or hardware.

The verification server is configured to perform the biometric verification before the name matching.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

The present invention includes recognition of the need for supporting security and surveillance teams to track and identify people within their properties, and share information, alerts and warnings securely across an encrypted network, and control whom that information is shared with. With the addition of searchable facial recognition systems, and the creation of a private law enforcement-verified database of records (e.g., an expected 100 million-plus people in the database), including arrests and wanted lists across state lines, the present system and method provides security and surveillance professionals and organizations with the ability to know who someone is, and whether they are who they say they are, in operational real-time, e.g., when it matters. The present system and method can be employed by law enforcement of all stripes, for example, including intelligence agencies, private investigators, process servers, and other private sector security and surveillance professionals, and will eventually have more than a 100 million people in its database. The present system and method includes compiling and ingesting, county by U.S. county, law enforcement data on arrests, convictions and wanted lists.

For example, one out of three Americans will be arrested within their lifetime (i.e., 110 million Americans), 40% of that 110 million will be arrested an additional 4 times before they die (i.e., 44 million), 20% of that 110 million Americans will be arrested at least an additional 10+ more times. Accordingly, the present system and method includes building the largest repository of 100% law enforcement-verified data and providing fast and accurate search tools that allow running searches on any individual in near-operational real time. While the present system and method employs arrest records, the present system and method can employ city, county, state, tribal and federal sex offender lists, wanted lists and other law enforcement lists from around the world, for example, including INTERPOL, EUROPOL, and the like. The present system and method presently includes access to data from 1,173 counties, 39 states and 24 countries, over and above the 191 countries that INTERPOL supports.

The present system and method was developed after speaking to various law enforcement professionals and realizing that one of the major problems they had was easy access to multi-jurisdictional data on criminals in real time, or on the go. Crime and criminals travel but access to information on criminals doesn't travel as easily. The present system and method is designed to provide this access in about 30 seconds or so, including on mobile devices, where advantageously, all the information is in one place.

The present system and method includes a search engine connected to a 100% law-enforcement-sourced and verified database of people that have been arrested, convicted of a crime, or are wanted by law enforcement in connection with one. The present system and method includes an arrest database but as someone goes through the system, it will eventually update the status of cases, when law enforcement bodies update those statuses. Other lists, for example, including sex offender registries, and the like, can be employed. The database of the present system and method can be integrated, for example, with a facial recognition system currently used by the US Department of Defense.

Except for collecting and amalgamating the data at the back end by the present system and method, the data is sourced 100% from law enforcement public records, without modification, in order to not compromise data integrity, including any inconsistencies in how the data is entered from state to state or even county to county. The present system and method does not correct possible inputting errors, for example, an arrest record detailing a person as having "blue" hair, as entered by law enforcement.

The present system and method can allow for unlimited searches, to allows different options on spelling, details, and the like. The present system and method amalgamates such data at the back end, so that there isn't any problem if someone searches for "W" instead of "White" or "Caucasian" or "Black," when the data is entered as "Blk." Accordingly, spelling errors are possible, advantageously, addressed by providing unlimited searches, so that a user can check for different spellings of a name or try combinations.

As an example, information on a person with 37 arrests across five or six Kentucky counties, dating back to 1995, can be merged the present system and method at the back end, so an investigator looking at it can quickly see all the arrests in the database and multi-jurisdictional data in one place very quickly, saving an immense amount of time, and establishing a pattern.

The present system and method allows a subscriber (e.g., based on access control, including a login and password, IP addresses, actual addresses, credit card information, and the like) to run, for example, unlimited searches, as simply as running a Google search, by typing in a name or by uploading a face against a multi-jurisdictional database, and generates results in about 30 seconds. Users can search for arrest history across jurisdictions, search by name, can upload any photograph, and do a facial recognition (FR) search (e.g., based on uploading a Facebook public profile photograph, and running it against the system, and the like).

The present system and method allows a subscriber to check someone out from a mobile device, and the like. For example, the present system and method allows an officer in Pittsburgh who stopped someone on the road, to take a photo of them, run it, and find out in about 30 seconds if person is a serial sex offender in St. Mary Parish, Louisiana, and has skipped bail, and the like. Similarly, a security team member at a stadium can run a 15-second search on their cell phone and find that a spectator acting oddly has a prior conviction for distribution of drugs. Someone who is called in to break up a dispute might run the names or faces against in the present system and method and find out in under 30 seconds if one of the parties has been previously arrested for aggravated battery in Douglas Co, Wisconsin, and the like.

The present system and method allows a subscriber to run mobile searches by logging in and uploading a photo, and in further embodiments via a mobile application that captures facial recognition from a video, and the like, and runs it in the system and method in seconds. The present system and method can employ facial recognition (FR), for example, employed by the US Department of Defense, and the like. The biometrics can be based on a graduated scale of confidence and can employ a mix of human and machine intelligence, and the like.

The present invention includes recognition that TV shows have made life harder for people dealing with biometrics in real life. For example, in the real world you can't take someone's fingerprint or DNA and say with 100% certainty that person matches the fingerprint or DNA. Accordingly, the more points of similarity, be it on the fingerprint or DNA, the more confident one becomes. Facial recognition is no different, the higher the score, the higher the confidence level.

The present invention includes recognition that facial recognition depends on several aspects, such as comparing a face to one or one million similar faces. For example, if you are doing a 1 to 1 match, say a picture of the person standing in front of you and his driver's license, or the photo inside the chip in his passport, this kind of match can have a fairly high confidence level (e.g., 90+% depending on the time between the initial photo and the current one). If you are doing a 1 to many or 1 to N search, the accuracy rate drops but is still a key factor in improving your search ability. This also depends on how many photos of an individual the gallery or database has and over what time period.

Computers look at faces differently from humans. They look at points in a facial template, whereas we look at the whole face. For example, if in the case of a sex offender, the system and method can employ a photo of an individual every year (e.g., for the worst sex offenders this is a requirement of Megan's Law), and when the system and method is presented with a photo or video of a person on such a list, it is likely the person would be found within the first 10 results. A human looking at the matches presented by the algorithm of the present system and method can be employed to provide the best option, and the present system and method can runs a match against millions in the database in mere seconds, as compared to a human.

The present system and method includes a monitoring product that allows creation of a private database, for example, of employees or staffers, and the like, and which can be employed by the present system and method to upload images and relevant information to such private database (e.g., such private database can be visible only to an organization's human resource (HR) department, authorized personnel, and the like), and then run continuous comparisons against the larger database of the present system and method.

Thus, the present system and method can be employed for providing more information on human assets, that it can be accessed anytime, anywhere, and in a platform agnostic manner. Advantageously, the present system and method can provide an organization with the ability to enter employees into a database, and be notified in near real-time, for example, through an encrypted alert, notification, and the like, (e.g., to its HR department) when one of its employees has potentially been arrested. This would allow any company that has a requirement to do an annual background check (e.g., typically costing between $50-$250 or more per employee) to cut costs, improve notification systems, share information to protect their human and other assets, while not compromising any individual's personally identifiable information (PII) data (e.g., by employing end to end encryption). Accordingly, the present system and method can be employed to allow continuous monitoring, which is a dramatic improvement over a single annual background check.

In an illustrative embodiment, the present system and method can be employed by loading employees (or any other list of people) into a completely separate silo that sits beneath a criminal database. Because such silo data is PII data, it would not be accessible to anyone else, and even within an organization it would only be available to authorized personnel from the organization. Accordingly, the present system and method can be employ extensive security to ensure that only organizational people with authority have access to the data in the silo. The present system and method can then run comparisons of the silo against the present system and method on a constant basis. The data in present system and method can updated, for example, between every hour to 24 hours, depending on a county, when it is updated, how often it makes that updated data available, and the like.

For example, if someone called John Smith is arrested and the organization has a John Smith on their list, the present system and method can be employed at the backend can automatically run a search against several parameters to see if a John Smith that was arrested is a possible match to the John Smith on organizations' record. Age, other demographic characteristics, Facial Recognition, and the like, can also be matched. If all of those are a potential match, the present system and method can send authorized personnel an encrypted alert, asking them to have a look at the information on the matching John Smiths, for double-checking of such information at a human level.

For example, assuming ABC Airlines has more than 200,000 employees, and would want to be notified if a pilot was arrested (and later released) for a DUI. In this case, say Pilot A, based in Atlanta, was arrested in Jacksonville, Florida for a DUI, and is then released on bail. Every state has a different procedure for suspending a person's license before the case goes to court, and in many cases, the home state is not notified immediately, pending a decision in a court hearing. But through the present system and method, ABC Airlines' HR Department would know as soon as Duval County, FL, updates its database, and Pilot A's information is added to their arrest database and that information is ingested into the present system and method, that someone with a similar name or other characteristics to Pilot A, was arrested in Jacksonville for a DUI. The airline would then be able to make more informed decision about scheduling, and the like, with such information.

As of Dec. 31, 2017, the present system and method includes about six million records from more than 220 jurisdictions, and growing, as more counties are added. Data can be updated between an hour to 24 hours, wherever possible, so the data is current once a county has come into an intake pipeline, allowing the present system and method follow someone as they go through the system.

Accordingly, the present system and method is adding such information, county by county. For example, Maricopa County, Arizona, was added on Oct. 20, 2017. While no historic data for Maricopa is available, as the county keeps records publicly available for only 72 hours, the present system and method has more available data now for investigators than they've ever had before, and access to this data available in seconds. The database of the present system and method will get stronger as more counties are added.

Advantageously, the present system and method allows a user to access and see multijurisdictional arrest and conviction data for an individual in one place in seconds. A search can be run against a face, using facial recognition, in near real time. Text or facial recognition searches can be run on a mobile device. Access to such information can be provided within minutes of a county uploading relevant data, so that the data is constantly updated and always current. The present system and method allows a user to continuously monitor people on their individual private list, so that the use is notified within minutes of an arrest, with the data including what has potentially happened and where.

Figure 1:
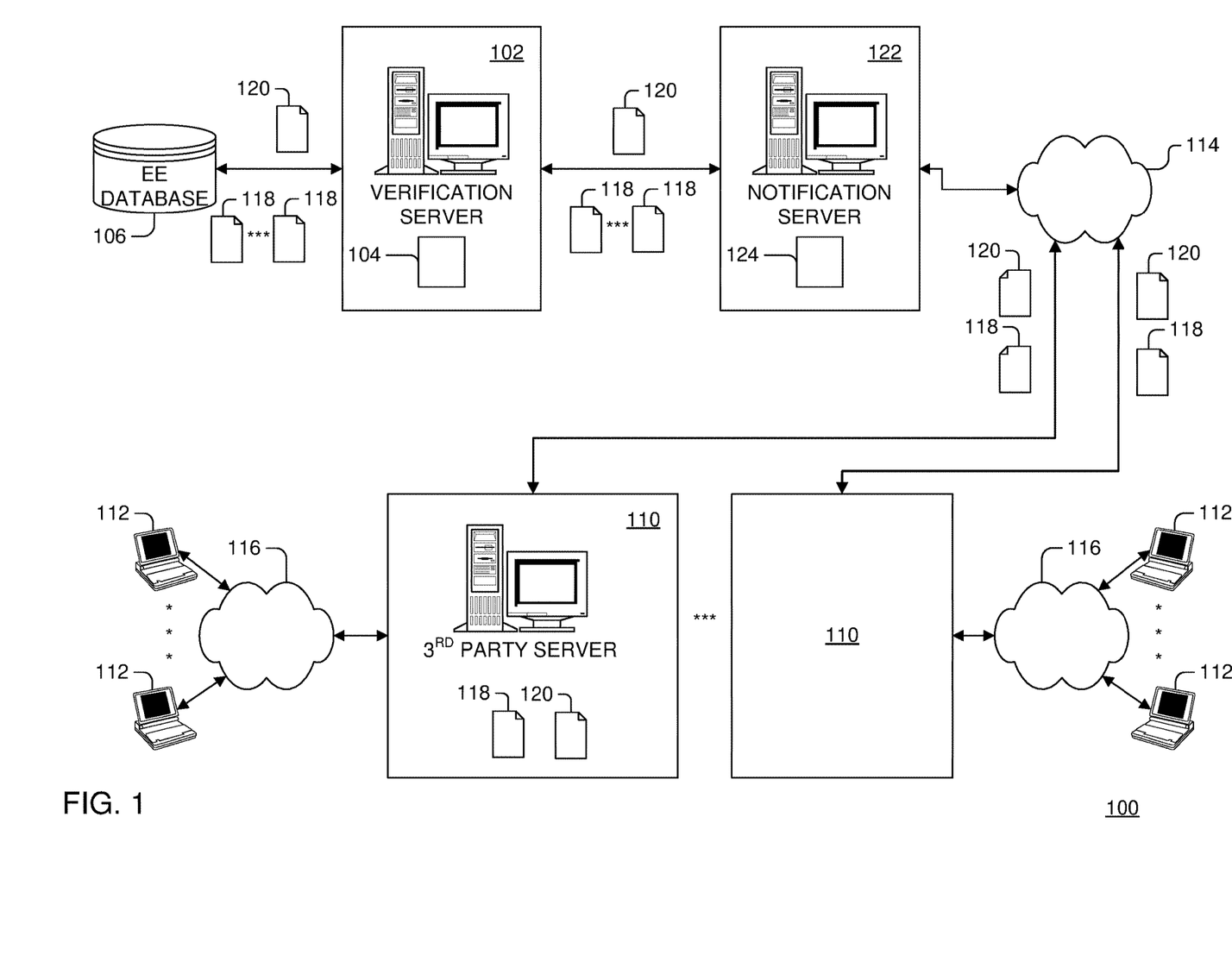
FIG. 1 is an illustrative system for monitoring existing and potential employees based on biometric information.

Referring now to the drawings, wherein like reference numerals designate identical or corresponding parts throughout the several views, and more particularly to FIG. 1 thereof, there shown an illustrative system for monitoring, for example, of existing and potential employees, and the like, based on biometric information, and the like, in an efficient and cost-effective manner. In FIG. 1, verification requests 118 (e.g., for existing or potential employees, and the like) are received from third party servers 110 (e.g., email, short message service (SMS), Multimedia Messaging Service (MMS), WhatsApp Messenger, any suitable third party messaging platforms, etc.) from customer devices 112 over networks 114 and 116 by notification server 122 running suitable notification software 124. Biometric verification results 120 are computed and sent back, for example, as determined from employee database 106, for example, by software and/or hardware 104 (e.g., based on automated fingerprint identification system (AFIS), automated biometrics identification system (ABIS), Cognitec facial recognition, FaceVACS facial recognition, IRIS ID identity authentication, UIDAI face authentication application programming interface (API), PalmSecure biometric authentication, and the like) running on verification server 102.

Figure 2:
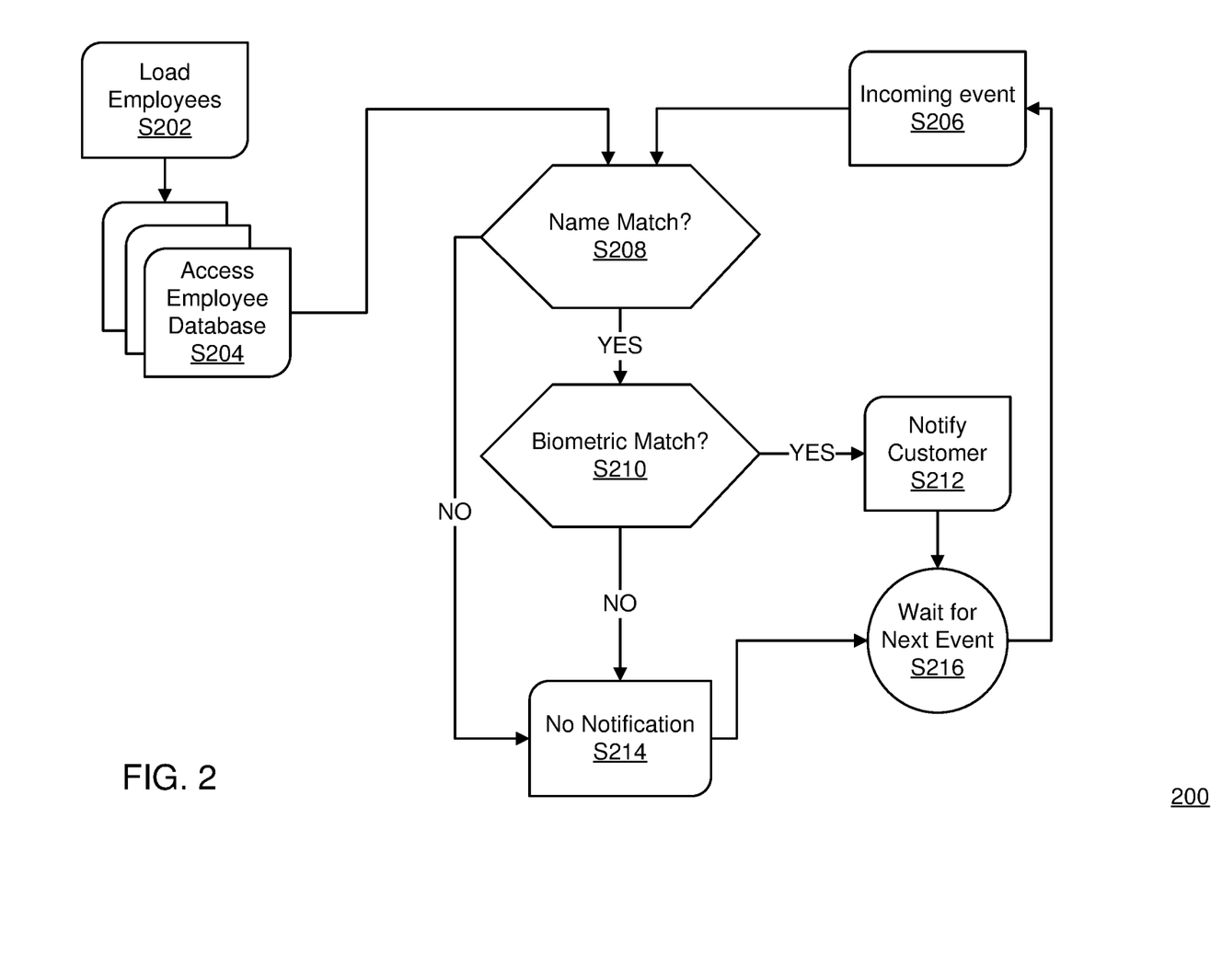
FIGS. 2-3 are illustrative flow charts for monitoring existing and potential employees in the system of FIG. 1.
Figure 3:
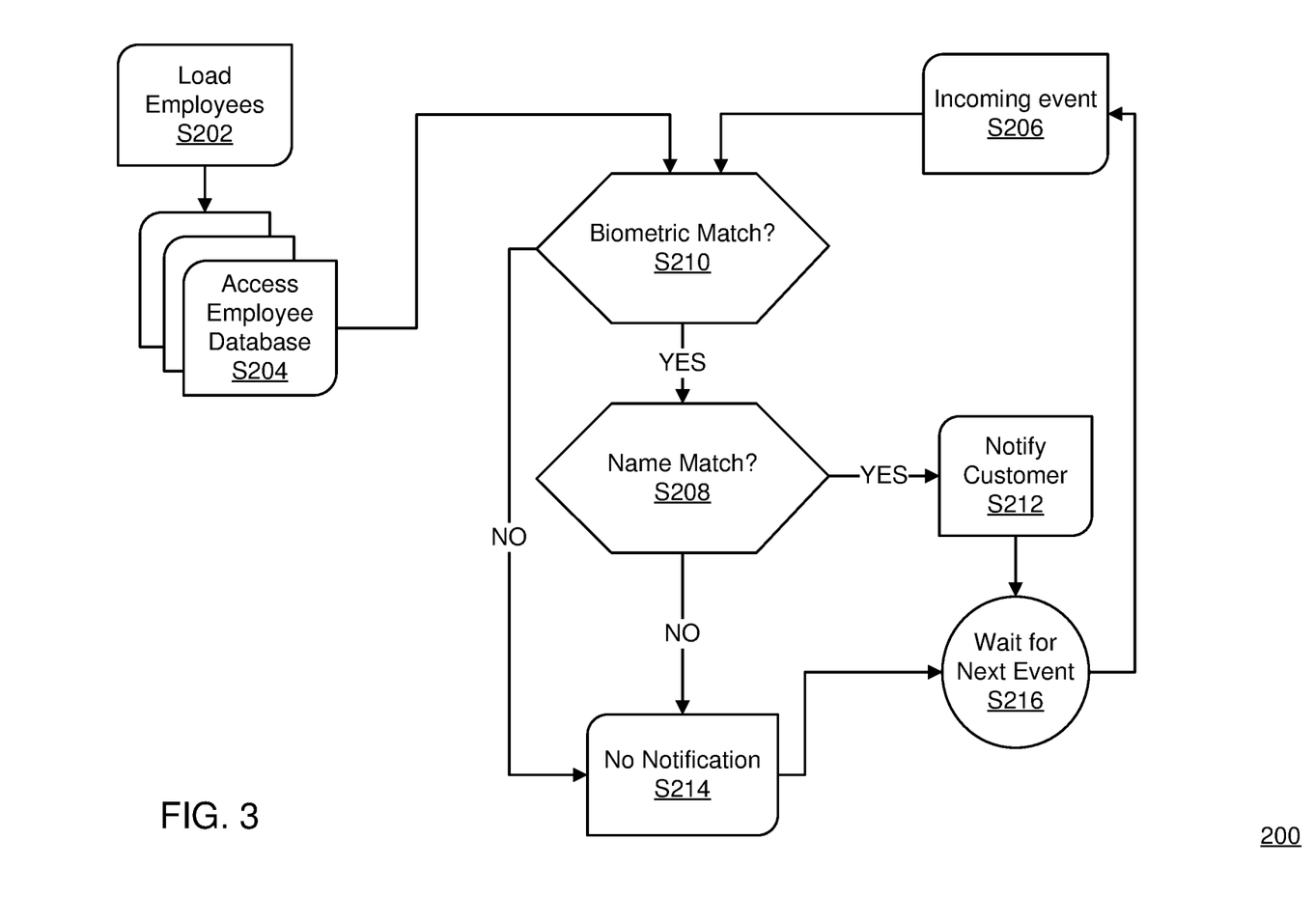

FIGS. 2-3 are illustrative flow charts for monitoring, for example, of existing and potential employees, and the like, based on biometric information, and the like, in the system of FIG. 1. In FIG. 2, at step S202 employee information is stored in the employee database 106. At step S204, the verification server 102 accesses the employee database 106 based on an incoming event, at step S206, such as an employee verification request, and the like, received from the notification server 122 via the third party servers 110 from the customer devices 112 over the networks 114 and 116.

At step 208, the verification server 102 determines if the employee name matches a name in the employee database

106. If the verification server 102 determines that there is no employee name match, no result notification is sent at step 214, and the verification server 102 waits for another incoming event at step 216. If the verification server 102 determines at step 208 that there is an employee name match, control proceeds to step 210 where the verification server 102 determines if there is an employee biometric verification results match 120, for example, by the software and/or hardware 104 running on the verification server 102. If the verification server 102 determines that there is no employee biometric verification results match 120, no result notification is sent at step 214, and the verification server 102 waits for another incoming event at step 216, completing the processing.

If the verification server 102 determines at step 210 that there is an employee biometric verification results match, a result notification is sent to the customer devices 112 at step 212, via notification server 122, and the third party servers 110 over the networks 114 and 116, and the verification server 102 waits for another incoming event at step 216, completing the processing. In further illustrative embodiments, the matching steps 208 and 210 can be switched, as needed, as will be appreciated by those of ordinary skill in the relevant art(s).

FIG. 3 is similar to FIG. 2, except wherein the determination at step 210 that there is an employee biometric verification results match is performed before step 208, wherein the verification server 102 determines if the employee name matches a name in the employee database 106.

Advantageously, the illustrative systems and methods allow for monitoring, for example, of existing and potential employees, and the like, based on biometric information, and the like, in an efficient and cost-effective manner.

Although the illustrative systems and methods are described in terms of monitoring, for example, of existing and potential employees, the illustrative systems and methods can be applied to any other suitable types of monitoring based on biometric information, and the like, as will be appreciated by those of ordinary skill in the relevant art(s).

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A system for continuous monitoring based on biometric information, the system comprising:
    a private law enforcement database stored in non-transitory memory, programmed to be updated at a predetermined time period based on unmodified, multi-jurisdictional law enforcement public records with jurisdictional data entry inconsistencies, including criminal arrests, convictions and wanted criminals;
    a private database stored in non-transitory memory, programmed to be only accessible by a user authorized by an employer, and including existing employee information having existing employee name and photograph for each of the existing employees;
    a notification server separate from the private database configured to transmit an incoming encrypted event signal when, during continuous monitoring of the existing employees, the private law enforcement database is updated to include a person potentially matching one of the existing employee names as provided by the employer, and including a name and photograph of the person potentially matching the one of the existing employee names as a name and photograph of an employee to be verified; and
    a verification server separate from the private database and communicatively coupled to the notification server via a secure communications network and including one or more processors and memory storing instructions which, when executed, cause the verification server to:
    receive the incoming encrypted event signal including the name and photograph of the employee to be verified from the notification server;
    access the private database based on the incoming encrypted event signal including the name and photograph of the employee to be verified received from the notification server;
    determine if the name of the employee to be verified matches one of the existing employee names in the private database;
    when the name of the employee to be verified does match one of the existing employee names in the private database, determine by biometric hardware and/or software facial verification if the photograph of the employee to be verified biometrically matches one of the existing employee photographs in the private database;
    when the name of the employee to be verified does not match any of the existing employee names in the private database, skip the biometric verification of the employee to be verified, not transmit a result notification signal regarding the incoming event signal, and await another incoming event signal;
    when the name of the employee to be verified matches one of the existing employee names and the photograph of the employee to be verified biometrically matches the one of the existing employee photographs, transmit a positive verification encrypted result notification signal to a device of the authorized user via the notification server on continuous monitoring basis, the positive verification encrypted result notification signal including multijurisdictional arrest and/or conviction digital data associated with the employee to be verified; and
    when the name of the employee to be verified matches one of the existing employee names and the photograph of the employee to be verified biometrically does not match one of the existing employee photographs, not transmit a result notification signal regarding the incoming event signal, and await another incoming event signal,
    wherein the verification server conserves processing resources and bandwidth by avoiding biometric comparison and result transmission when no name match is found in the private database, and
    wherein the biometric facial verification is performed using facial recognition software and/or hardware configured to compare the received photograph with the stored biometric photograph and produce a similarity score based on biometric features.

2. The system of claim 1, wherein at least one of the name of the person and the photograph of the person is received from a device that is authorized by the employer via a third party server coupled to the notification server over the secure communications network, and
    the positive verification encrypted result notification signal is transmitted to the device that is authorized by the employer via the third party server coupled to the notification server over the secure communications network.

3. The system of claim 2, wherein the third party server includes one of an email server, a short message service (SMS) server, a multimedia messaging service (MMS) server, a WhatsApp Messenger server, and a third party messaging platform.

4. The system of claim 1, wherein the biometric verification is based on software and/or hardware running on the verification server including at least one of automated fingerprint identification system (AFIS) software and/or hardware, automated biometrics identification system (ABIS) software and/or hardware, Cognitec facial recognition software and/or hardware, FaceVACS facial recognition software and/or hardware, IRIS ID identity authentication software and/or hardware, UIDAI face authentication application programming interface (API) software and/or hardware, and PalmSecure biometric authentication software and/or hardware.

5. The system of claim 1, wherein the private law enforcement database is updated at the predetermined time period being at least every 24 hours.

6. A method for continuous monitoring based on biometric information, the method comprising:
storing, in a private law enforcement database having non-transitory memory that is programmed to be updated at a predetermined time period, unmodified, multi-jurisdictional law enforcement public records with jurisdictional data entry inconsistencies, including criminal arrests, convictions and wanted criminals;
storing, in a private database having non-transitory memory that is programmed to be only accessible by a user authorized by an employer, existing employee information having existing employee name and photograph for each of the existing employees;
transmitting, with a notification server separate from the private database an incoming encrypted event signal when, during continuous monitoring of the existing employees, the private law enforcement database is updated to include a person potentially matching one of the existing employee names as provided by the employer, and including a name and photograph of the person potentially matching the one of the existing employee names as a name and photograph of an employee to be verified;
communicatively coupling a verification server separate from the private database to the notification server via a secure communications network, the verification server including one or more processors and memory storing instructions which, when executed, cause the verification server to perform the steps of:
receiving the incoming encrypted event signal including the name and photograph of the employee to be verified from the notification server;
accessing based on the incoming encrypted event signal including the name and photograph of the employee to be verified received from the notification server; and
determining if the name of the employee to be verified matches one of the existing employee names in the private database;
when the name of the employee to be verified does match one of the existing employee names in the private database, determining by biometric hardware and/or software facial verification if the photograph of the employee to be verified biometrically matches one of the existing employee photographs in the private database;
when the name of the employee to be verified does not match any of the existing employee names in the private database, skipping the biometric verification of the employee to be verified, not transmitting a result notification signal regarding the incoming event signal, and awaiting another incoming event signal;
when the name of the employee to be verified matches one of the existing employee names and the photograph of the employee to be verified biometrically matches the one of the existing employee photographs, transmitting a positive verification encrypted result notification signal to a device of the authorized user via the notification server on continuous monitoring basis, the positive verification encrypted result notification signal including multijurisdictional arrest and/or conviction digital data associated with the employee to be verified; and
when the name of the employee to be verified matches one of the existing employee names and the photograph of the employee to be verified biometrically does not match one of the existing employee photographs, not transmitting a result notification signal regarding the incoming event, and awaiting another incoming event signal;
wherein the verification server conserves processing resources and bandwidth by avoiding biometric comparison and result transmission when no name match is found in the private database, and
wherein the biometric facial verification is performed using facial recognition software and/or hardware configured to compare the received photograph with the stored biometric photograph and produce a similarity score based on biometric features.

7. The method of claim 6, further comprising:
receiving at least one of the name of the person and the photograph of the person from a device that is authorized by the employer via a third party server coupled to the notification server over the secure communications network, and
transmitting the positive verification encrypted result notification signal to the device that is authorized by the employer via the third party server coupled to the notification server over the secure communications network.

8. The method of claim 7, wherein the third party server includes one of an email server, a short message service (SMS) server, a multimedia messaging service (MMS) server, a WhatsApp Messenger server, and a third party messaging platform.

9. The method of claim 6, wherein the biometric verification is based on software and/or hardware running on the verification server including at least one of automated fingerprint identification system (AFIS) software and/or hardware, automated biometrics identification system (ABIS) software and/or hardware, Cognitec facial recognition software and/or hardware, FaceVACS facial recognition software and/or hardware, IRIS ID identity authentication software and/or hardware, UIDAI face authentication application programming interface (API) software and/or hardware, and PalmSecure biometric authentication software and/or hardware.

10. The method of claim 6, further comprising updating the private law enforcement database at the predetermined time period being at least every 24 hours.

11. A non-transitory computer-readable medium for continuous monitoring based on biometric information and with instructions stored thereon, that when executed by a processor, perform steps comprising:
storing, in a private law enforcement database having non-transitory memory that is programmed to be updated at a predetermined time period, unmodified, multi-jurisdictional law enforcement public records with jurisdictional data entry inconsistencies, including criminal arrests, convictions and wanted criminals;

storing, in a private database having non-transitory memory that is programmed to be only accessible by a user authorized by an employer, existing employee information having existing employee name and photograph for each of the existing employees;

transmitting, with a notification server separate from the private database an incoming encrypted event signal when, during continuous monitoring of the existing employees, the private law enforcement database is updated to include a person potentially matching one of the existing employee names as provided by the employer, and including a name and photograph of the person potentially matching the one of the existing employee names as a name and photograph of an employee to be verified;

communicatively coupling a verification server separate from the private database to the notification server via a secure communications network, the verification server including one or more processors and memory storing instructions which, when executed, cause the verification server to perform the steps of:

receiving the incoming encrypted event signal including the name and photograph of the employee to be verified from the notification server;

accessing based on the incoming encrypted event signal including the name and photograph of the employee to be verified received from the notification server; and determining if the name of the employee to be verified matches one of the existing employee names in the private database;

when the name of the employee to be verified does match one of the existing employee names in the private database, determining by biometric hardware and/or software facial verification if the photograph of the employee to be verified biometrically matches one of the existing employee photographs in the private database;

when the name of the employee to be verified does not match any of the existing employee names in the private database, skipping the biometric verification of the employee to be verified, not transmitting a result notification signal regarding the incoming event signal, and awaiting another incoming event signal;

when the name of the employee to be verified matches one of the existing employee names and the photograph of the employee to be verified biometrically matches the one of the existing employee photographs, transmitting a positive verification encrypted result notification signal to a device of the authorized user via the notification server on continuous monitoring basis, the positive verification encrypted result notification signal including multijurisdictional arrest and/or conviction digital data associated with the employee to be verified; and when the name of the employee to be verified matches one of the existing employee names and the photograph of the employee to be verified biometrically does not match one of the existing employee photographs, not transmitting a result notification signal regarding the incoming event, and awaiting another incoming event signal;

wherein the verification server conserves processing resources and bandwidth by avoiding biometric comparison and result transmission when no name match is found in the private database, and wherein the biometric facial verification is performed using facial recognition software and/or hardware configured to compare the received photograph with the stored biometric photograph and produce a similarity score based on biometric features.

12. The computer-readable medium of claim 11, further comprising:

receiving at least one of the name of the person and the photograph of the person from a device that is authorized by the employer via a third party server coupled to the notification server over the secure communications network, and transmitting the positive verification encrypted result notification signal to the device that is authorized by the employer via the third party server coupled to the notification server over the secure communications network.

13. The computer-readable medium of claim 12, wherein the third party server includes one of an email server, a short message service (SMS) server, a multimedia messaging service (MMS) server, a WhatsApp Messenger server, and a third party messaging platform.

14. The computer-readable medium of claim 11, wherein the biometric verification is based on software and/or hardware running on the verification server including one of automated fingerprint identification system (AFIS) software and/or hardware, automated biometrics identification system (ABIS) software and/or hardware, Cognitec facial recognition software and/or hardware, FaceVACS facial recognition software and/or hardware, IRIS ID identity authentication software and/or hardware, UIDAI face authentication application programming interface (API) software and/or hardware, and PalmSecure biometric authentication software and/or hardware.

15. The computer-readable medium of claim 11, further comprising updating the private law enforcement database at the predetermined time period being at least every 24 hours.

* * * * *